(12) United States Patent
Nicholas et al.

(10) Patent No.: US 11,585,776 B2
(45) Date of Patent: Feb. 21, 2023

(54) CHLORINE SPECIES SENSING USING PSEUDO-GRAPHITE

(71) Applicants: ABB Schweiz AG, Baden (CH); University of Idaho, Moscow, ID (US)

(72) Inventors: Nolan Nicholas, Granby, CT (US); Ignatius Cheng, Moscow, ID (US); Humayun Kabir, Moscow, ID (US); Jeremiah D. Foutch, Keller, TX (US)

(73) Assignees: ABB Schweiz AG, Baden (CH); University of Idaho, Moscow, ID (US)

(*) Notice: Subject to any disclaimer, the term of this patent is extended or adjusted under 35 U.S.C. 154(b) by 245 days.

(21) Appl. No.: 16/292,318

(22) Filed: Mar. 5, 2019

(65) Prior Publication Data
US 2020/0284748 A1   Sep. 10, 2020

(51) Int. Cl.
G01N 27/30        (2006.01)
G01N 27/416      (2006.01)

(52) U.S. Cl.
CPC ....... *G01N 27/308* (2013.01); *G01N 27/4168* (2013.01)

(58) Field of Classification Search
CPC .............. G01N 27/327; G01N 33/543; G01N 33/1806; G01N 33/1866; G01N 27/308; G01N 27/4167; G01N 27/4168; G01N 27/3271; C12Q 1/00; Y02E 60/527; H01M 8/16

See application file for complete search history.

(56) References Cited

U.S. PATENT DOCUMENTS

| | | |
|---|---|---|
| 4,725,422 A | 2/1988 | Miyabayashi et al. |
| 5,290,592 A | 3/1994 | Izuchi et al. |
| 5,571,638 A | 11/1996 | Satoh et al. |
| 7,442,358 B2 | 10/2008 | Sano et al. |
| 9,691,556 B2 | 6/2017 | Cheng et al. |
| 2005/0079119 A1 | 4/2005 | Kawakami et al. |
| 2006/0062713 A1 | 3/2006 | Sano et al. |
| 2006/0062715 A1 | 3/2006 | Endo et al. |
| 2006/0121279 A1 | 6/2006 | Petrik |
| 2007/0092432 A1 | 4/2007 | Prud'Homme et al. |
| 2009/0059474 A1 | 3/2009 | Zhamu et al. |
| 2009/0068471 A1 | 3/2009 | Choi et al. |
| 2009/0155561 A1 | 6/2009 | Choi et al. |
| 2012/0228555 A1 | 9/2012 | Cheng et al. |

(Continued)

FOREIGN PATENT DOCUMENTS

| | | | |
|---|---|---|---|
| CN | 1715899 A | * | 1/2006 |
| CN | 1715899 A | | 4/2006 |

(Continued)

OTHER PUBLICATIONS

Gyan et al. (ChemElectroChem 2015, 2, 700-706 (Year: 2015).*

(Continued)

*Primary Examiner* — Gurpreet Kaur
(74) *Attorney, Agent, or Firm* — Armstrong Teasdale LLP

(57) ABSTRACT

Methods, electrodes, and sensors for chlorine species sensing using pseudo-graphite are disclosed. In one illustrative embodiment, a method may include coating a pseudo-graphite material onto a surface of an electrode substrate to produce a pseudo-graphite surface. The method may also include exposing the pseudo-graphite surface to a sample to detect chlorine species in the sample.

22 Claims, 8 Drawing Sheets

(56) References Cited

U.S. PATENT DOCUMENTS

| | | | |
|---|---|---|---|
| 2012/0304743 | A1 | 12/2012 | Rajasekharan |
| 2014/0001047 | A1 | 1/2014 | Kahn et al. |
| 2014/0111906 | A1 | 4/2014 | Eilertsen |
| 2015/0377824 | A1 | 12/2015 | Ruhl et al. |
| 2016/0351967 | A1 | 12/2016 | Kako et al. |
| 2017/0008825 | A1 | 1/2017 | Johnson et al. |
| 2017/0077557 | A1 | 3/2017 | Zheng et al. |
| 2017/0169959 | A1 | 6/2017 | Cheng et al. |
| 2018/0224390 | A1* | 8/2018 | Pan ................... G01N 27/301 |
| 2018/0362349 | A1 | 12/2018 | Zhong et al. |
| 2019/0041356 | A1 | 2/2019 | Pan et al. |
| 2019/0079043 | A1 | 3/2019 | Johnson, Jr. et al. |
| 2020/0284747 | A1 | 9/2020 | Nicholas et al. |
| 2020/0284748 | A1 | 9/2020 | Nicholas et al. |
| 2020/0284749 | A1 | 9/2020 | Nicholas et al. |
| 2020/0284750 | A1 | 9/2020 | Nicholas et al. |
| 2020/0284751 | A1 | 9/2020 | Nicholas et al. |
| 2020/0284755 | A1 | 9/2020 | Nicholas et al. |

FOREIGN PATENT DOCUMENTS

| | | | |
|---|---|---|---|
| CN | 101763944 | A | 6/2010 |
| CN | 107017270 | A | 8/2017 |
| EP | 0165047 | A2 | 12/1985 |
| JP | 2009093819 | A | 4/2009 |
| JP | 2017027919 | A | 2/2017 |
| KR | 20100118808 | A | 11/2010 |
| KR | 1020110069458 | A | 6/2011 |
| RU | 2163375 | C2 | 2/2001 |
| WO | 1998/020331 | A1 | 1/1998 |
| WO | 2001/064938 | A2 | 9/2001 |
| WO | 2002/082069 | A1 | 10/2002 |
| WO | 2014116026 | A1 | 7/2014 |
| WO | 2018181802 | A1 | 10/2018 |

OTHER PUBLICATIONS

Supplemental Info of Gyan et al. (Year: 2015).*
Tomei et al., Talanta, 2018, 262-267. (Year: 2018).*
Minhua Shao et al., "Recent Advances in Electrocatalysts for Oxygen Reduction Reaction," Chemical Reviews, vol. 116(6), Feb. 17, 2016, pp. 3594-3657.
Andrew A. Gewirth et al., "Nonprecious Metal Catalysts for Oxygen Reduction in Heterogeneous Aqueous Systems," Chemical Reviews, vol. 118(5), Jan. 31, 2018, pp. 2313-2339.
Subal Dey et al, "Molecular electrocatalysts for the oxygen reduction reaction," Nature Reviews Chemistry, vol. 1(98), Dec. 6, 2017, pp. 1-20.
Olga Naumov et al., "The stability limits of highly active nitrogen doped carbon ORR nano-catalysts: a mechanistic study of degradation reactions," Nanoscale, vol. 10(14), Mar. 1, 2018, pp. 6724-6733.
Yanguang Li et al., "Metal-Air Batteries: Will They Be the Future Electrochemical Energy Storage Device of Choice?," ACS Energy Letters, vol. 2(6), May 5, 2017, pp. 1370-1377.
Bin Xu et al., "Modification of vertically aligned carbon nanotubes with RuO2 for a solid-state pH sensor," Electrochimica Acta, vol. 55(8), Mar. 1, 2010, pp. 2859-2864.
Tong-Shen Liu et al., "Au—Fe(III) nanoparticle modified glassy carbon electrode for electrochemical nitrite sensor," Journal of Electroanalytical Chemistry, vol. 632(1-2) Jul. 1, 2019, pp. 197-200.
Kristin R. Kneten et al., "Effects of Redox System Structure on Electron-Transfer Kinetics at Ordered Graphite and Glassy Carbon Electrodes," Analytical Chemistry, vol. 64(21), Nov. 1, 1992, pp. 2518-2524.
Claudia C. Villarreal et al., "Carbon allotropes as sensors for environmental monitoring," Current Opinion in Electrochemistry, vol. 3(1), Jun. 2017, pp. 106-113.
Kevin W. Hathcock et al., "Incipient Electrochemical Oxidation of Highly Oriented Pyrolytic Graphite: Correlation between Surface Blistering and Electrolyte Anion Intercalation," Analytical Chemistry, vol. 67(13), Jul. 1, 1995, 2201-2206.
Paul K. Chu et al., "Characterization of amorphous and nanocrystalline carbon films," Materials Chemistry and Physics, vol. 96(2-3), Apr. 10, 2006, pp. 253-277.
Isaiah O. Gyan et al., "A Study of the Electrochemical Properties of a New Graphitic Material: GUITAR," ChemElectroChem, vol. 2(5), Feb. 12, 2015, pp. 700-706.
Zhen Yuan Xia et al., "Synergic Exfoliation of Graphene with Organic Molecules and Inorganic Ions for the Electrochemical Production of Flexible Electrodes," ChemPlusChem, vol. 79(3), Jan. 29, 2014, pp. 439-446.
"Carbon Nanotube | Purity | Evaluation of Purity and Heat Resistance," Shimadzu, online at https://www.shimadzu.com/an/industry/ceramicsmetalsmining/0102005.html, downloaded Oct. 10, 2019, 4 pages.
B. Rösner et al., "Dispersion and characterization of arc discharge single-walled carbon nanotubes—towards conducting transparent films," Nanoscale, vol. 6(7), Jan. 14, 2014, pp. 3695-3703.
So Yeun Kim et al., "Facile Synthesis of Carbon-Coated Silicon/Graphite Spherical Composites for High-Performance Lithium-Ion Batteries," ACS Applied Materials & Interfaces, vol. 8(19), Apr. 26, 2016, pp. 12109-12117.
Konstantinos Spyrou et al., "A novel route towards high quality fullerene-pillared graphene," Carbon, vol. 61, Sep. 2013, pp. 313-320.
Jarmila Vilčáková et al., "Effect of Surfactants and Manufacturing Methods on the Electrical and Thermal Conductivity of Carbon Nanotube/Silicone Composites," Molecules, vol. 17(11), Nov. 5, 2012, pp. 13157-13174.
Shuai Chen et al., "Branched CNT@SnO2 nanorods@carbon hierarchical heterostructures for lithium ion batteries with high reversibility and rate capability," Journal of Materials Chemistry A, vol. 2(37), Jul. 22, 2014, pp. 15582-15589.
Franco Cataldo, "A Study on the Thermal Stability to 1000° C. of Various Carbon Allotropes and Carbonaceous Matter Both Under Nitrogen and in Air," Fullerenes, Nanotubes and Carbon Nanostructures, vol. 10(4), Dec. 2002, pp. 293-311.
Xin Li et al., "Fabrication of ZnO nanowires array with nanodiamond as reductant," RSC Advances, vol. 6(99), Sep. 27, 2016, pp. 96479-96483.
Reeti Bajpai et al., "Rapid growth of onion-like carbon nanospheres in a microwave oven," CrystEngComm, Nov. 13, 2015, vol. 18(2), pp. 230-239.
R.I.R. Blyth et al., "XPS studies of graphite electrode materials for lithium ion batteries," Applied Surface Science, Oct. 16, 2000, vol. 167(1-2), pp. 99-106.
Jessica Campos-Delgado et al., "Bulk Production of a New Form of sp2 Carbon: Crystalline Graphene Nanoribbons," Nano Letters, Aug. 14, 2008, vol. 8(9), pp. 2773-2778.
Frank Cheng, "GUITAR: A New Material For Dimensionally Stable Anodes," Seminar Given To Washington State University Department of Civil and Environmental Engineering, May 2012, published online at https://www.webpages.uidaho.edu/ifcheng/recent_seminars_and_presentation.htm, 96 pages.
Frank Cheng et al., "GUITAR: A New Material For Dimensionally Stable Anodes," Paper No. 19649, 244th American Chemical Society National Meeting, Philadelphia, PA, Aug. 2012, published online at https://www.webpages.uidaho.edu/ifcheng/recent_seminars_and_presentation.htm, 69 pages.
I. Francis Cheng et al., "Highest measured anodic stability in aqueous solutions: graphenic electrodes from the thermolyzed asphalt reaction," RSC Advances, Feb. 21, 2013, vol. 3(7), pp. 2379-2384.
I. Francis Cheng et al., "Synthesis of graphene paper from pyrolyzed asphalt," Carbon, Jul. 2011, vol. 49(8), pp. 2852-2861.
Henriette Estrade-Szwarckopf, "XPS photoemission in carbonaceous materials: A "defect" peak beside the graphitic asymmetric peak," Carbon, Dec. 2004, vol. 42(8-9), pp. 1713-1721.
Yuqun Xie et al., "Sulfur as an important co-factor in the formation of multilayer graphene in the thermolyzed asphalt reaction," Journal of Materials Chemistry, Mar. 28, 2012, vol. 22(12), pp. 5723-5729.

(56) References Cited

OTHER PUBLICATIONS

ISA/RU, International Search Report and Written Opinion for Related PCT International Patent Application No. PCT/US2020/021130, dated Jun. 18, 2020, 8 pages.

ISA/RU, International Search Report and Written Opinion for Related PCT International Patent Application No. PCT/US2020/021137, dated Jun. 18, 2020, 8 pages.

ISA/RU, International Search Report and Written Opinion for Related PCT International Patent Application No. PCT/US2020/021145, dated Jun. 18, 2020, 8 pages.

ISA/RU, International Search Report and Written Opinion for Related PCT International Patent Application No. PCT/US2020/021149, dated Jun. 11, 2020, 6 pages.

Humayun Kabir et al., "The sp2-sp3 carbon hybridization content of nanocrystalline graphite from pyrolyzed vegetable oil, comparison of electrochemistry and physical properties with other carbon forms and allotropes," Carbon, vol. 144, Apr. 2019, pp. 831-840.

Ashleigh Anderson et al., "Investigating the Use of Endogenous Quinoid Moieties on Carbon Fibre as Means of Developing Micro pH Sensors," Materials Science and Engineering C, 2014, 533-537, 2014.

Isaiah O. Gyan et al., "Supporting Information: A Study of the Electrochemical Properties of a New Graphitic Material: GUITAR," ChemElectroChem, 2015, 12 pages.

Isaiah O. Gyan et al., "Electrochemical Study of Biologically Relevant Molecules at Electrodes Constructed from GUITAR, a New Carbon Allotrope," Microchemical Journal, vol. 122, pp. 39-44, Apr. 8, 2015.

Chen et al., "Preparation of polystyrene/graphite nanosheet composite", Polymer, vol. 44, pp. 1781-1784, 2003.

Galdino et al. "Graphite Screen-Printed Electrodes Applied for the Accurate and Reagentless Sensing of pH," Analytical Chemistry, 87, 23, pp. 11666-11672, 2015.

Georgakilas et al. "Noncovalent Functionalization of Graphene and Graphene Oxide for Energy Materials, Biosensing, Catalytic, and Biomedical Applications," Chemical Reviews, 116, 9, pp. 5464-5519, 2016.

Singh et al., "Electrochemical Sensing of Hydrogen Peroxide Using Brominated Graphene as Mimetic Catalase," Electrochmica Acta, pp. 1435-1444, 2017.

Zhang et al., "Spectroscopic Investigation of Plasma-Fluorinated Monolayer Graphene and Application for Gas Sensing," pp. 8652-8661, 2016.

Zhang et al., "An Alternative Pathway to Water Soluble Functionalized Graphene From the Defluorination of Graphite Fluoride," Carbon, pp. 1022-1027, 2016.

Poh et al., "Hydroboration of Graphene Oxide: Towards Stoichiometric Graphol and Hydroxygraphane," Chemistry European Journal, pp. 8310-8136, 2015.

\* cited by examiner

| MATERIAL | LOD (μM) | LINEAR RANGE (μM) | SENSITIVITY (μA/mM-cm²) | STABILITY |
|---|---|---|---|---|
| GUITAR (CV) THIS WORK | 1.0 | 0-5000 | 215.8 | >7 DAYS[d] |
| GUITAR (CA) THIS WORK | 0.5 | 200-2200 | 55.2 | >7 DAYS[d] |
| CuO-NPs/MWCNT[34,a] | 0.085 | N/A | 17 | 7 DAYS[d] |
| BORON DOPED DIAMOND[15] | 0.16 | 400-2000 | 38 | 3 MONTHS[d] |
| Au[29,30,35] | 0.2-0.4 | 0.2-300 | 720 | 2 DAYS[30] <br> >7 DAYS[29] |
| Pt[23,29,36] | 0.2-1.4 | 2.8-60 | 670 | 6 DAYS[23] <br> 7 DAYS[29] |
| CARBON NANOTUBE[24] | 0.4 | 0.4-80 | 75 | 30 DAYS |
| AuNPs/GC[37,b] | 1.0 | 1-932 | 200 | N/A |
| Au MICRO ELECTRODE[25] | 1.5 | 0-80 | 278 | N/A |
| CARBON FIBER[38] | 1.9 | 15-800 |  | N/A |
| AMINATED-GLASSY CARBON[39] | 1.55 | 200-2000 | 283 | N/A |
| POLYMELAMINE MODIFIED SCREEN-PRINTED CARBON ELECTRODE[16] | 5.5 | 10-7000 | 210 | 7 DAYS |
| AuNPs/POLY-MnTAPP/GC[20,c] | 24.7 | N/A | 5 | 3 DAYS |
| AMINATED GRAPHITE[10] | N/A | 0.8-116 | 15 | N/A |
| GLASSY CARBON[37] | N/A | 0-2000 | 230 | N/A |

*FIG. 6*

| ROW | | | SENSITIVITY (µA/mM-cm²) | INTERCEPT | r² | NUMBER OF ELECTRODE SAMPLES, n |
|---|---|---|---|---|---|---|
| I UNDER N₂ | FIGURE 2A | | 55.2 | 13.0 | 0.99 | 5 |
| II UNDER AIR | FIGURE 3B | | 55.7 | 12.7 | 0.99 | 3 |
| III UNDER AIR | STABILITY TESTS (FIGURE S1 AND S2) | DAY 1 | 56.8 | 12.1 | 0.99 | 1 |
| | | 2 | 56.2 | 12.5 | 0.99 | 1 |
| | | 3 | 53.0 | 14.0 | 0.98 | 1 |
| | | 4 | 55.5 | 12.8 | 0.98 | 1 |
| | | 7 | 35.7 | 6.5 | 0.98 | 1 |
| IV UNDER AIR | REGENERATED | | 53.5 | 11.8 | 0.99 | 1 |

*FIG. 9*

CHLORINE SPECIES SENSING USING PSEUDO-GRAPHITE

CROSS-REFERENCE TO RELATED APPLICATIONS

This application is related to U.S. patent application Ser. No. 16/292,317 (titled "Chemical Oxygen Demand Sensing Using Pseudo-Graphite"), Ser. No. 16/292,320 (titled "pH Sensing Using Pseudo-Graphite"), Ser. No. 16/292,322 (titled "Technologies Using Pseudo-Graphite Composites"), Ser. No. 16/292,323 (titled "Technologies Using Nitrogen-Functionalized Pseudo-Graphite"), and Ser. No. 16/292,325 (titled "Technologies Using Surface-Modified Pseudo-Graphite"), all of which were filed on Mar. 5, 2019, by the co-applicants of the present application. The disclosures of the foregoing patent applications are all incorporated herein by reference in their entirety.

BACKGROUND

The present disclosure relates to electrodes for chlorine species detection, and more particularly to the utilization of pseudo-graphite electrodes for the detection of chlorine species.

Generally, some electrodes in a sensor are capable of detecting chlorine species, for example, chlorine species such as hypochlorite in a liquid. The electrodes may be utilized to detect a concentration of chlorine species in the liquid by applying an electrical potential through the electrode and measuring a resultant signal. However, most of these electrodes have high cost and low performance. Additionally, the electrode performance may be reduced due to fouling of the electrode or environmental interferences.

SUMMARY

The present disclosure includes one or more of the features recited in the appended claims and/or the following features which, alone or in any combination, may comprise patentable subject matter.

According to an aspect of the disclosed embodiments, a method may include coating a pseudo-graphite onto a surface of an electrode substrate to produce a pseudo-graphite surface. The method may also include exposing the pseudo-graphite surface to a sample to detect chlorine species in the sample.

In some embodiments, the method includes modifying the pseudo-graphite surface with an electrochemically sensitive material to alter a sensing property of the electrode to enhance the electrode for chlorine species detection. The method may include modifying the pseudo-graphite surface comprises adding amine groups to the pseudo-graphite surface to enhance the electrode for chlorine species detection. The amine groups may be added to the pseudo-graphite surface by a Kolbe electro-oxidation of a carbamate group. The method may include grafting the amine radicals to the pseudo-graphite surface. The method may include modifying the pseudo-graphite surface with gold nanoparticles.

In some embodiments, providing an electrode may include providing a working electrode. The working electrode may be modified to enhance the electrode for chlorine species detection. The method may also include providing a counter electrode. The method may include detecting chlorine species by measuring a current flow between the working electrode and the counter electrode. The method may include applying at least one of a steady state potential or a known potential to the working electrode.

In some embodiments, the pseudo-graphite may have fast heterogeneous electron transfer at a basal plane. The pseudo-graphite may have a corrosion resistance greater than graphitic materials. A carbon content of the pseudo-graphite may include 80-90% sp2 carbon and 10-20% sp3 carbon.

According to another aspect of the disclosed embodiments, an electrode may include an electrode substrate with a surface. A pseudo-graphite may be coated onto the surface of the electrode substrate to produce a pseudo-graphite surface for detection of chlorine species in a sample.

In some embodiments, the pseudo-graphite may be modified with an electrochemically sensitive material to alter a sensing property of the electrode to enhance the electrode for chlorine species detection. The pseudo-graphite surface may include amine groups to enhance the electrode for chlorine species detection. The pseudo-graphite surface may be modified by Kolbe electro-oxidation of carbamate groups to produce amine radicals. The amine radicals may be grafted to the pseudo-graphite surface. The pseudo-graphite may be modified with gold nanoparticles.

In some embodiments, the pseudo-graphite may have fast heterogeneous electron transfer at a basal plane. The pseudo-graphite may have a corrosion resistance greater than graphitic materials. A carbon content of the pseudo-graphite may include 80-90% sp2 carbon and 10-20% sp3 carbon.

According to yet another aspect of the disclosed embodiments, a sensor may include a working electrode and a counter electrode. An electrical source may supply at least one of a current or voltage to the working electrode. A measurement circuit may measure a resultant signal from the working electrode. The working electrode may include an electrode substrate with a surface. A pseudo-graphite may be coated onto the surface of the electrode substrate to produce a pseudo-graphite surface that enhances the electrode for chlorine species detection.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which:

FIG. 4A is a graph of chronoamperograms of 0, 0.2, 0.4, 0.6, 0.8, 1.0, 1.2, 1.4 and 1.6 mM free chlorine (a to i respectively) at −0.15 V.

FIG. 4B is a graph of cyclic voltammograms of 0, 0.5, 1.0, 1.5, 2.0 and 2.5 mM free chlorine (a to f respectively) at 50 mV/s;

FIG. 6 is a table of the comparison of cyclic voltammetric (CV) and chronoamperometric (CA) LOD, linear range, sensitivity, and signal stability for free chlorine sensor electrodes;

FIG. 9 is a table illustrating a summary of chronoamperometric sensing of free chlorine at pseudo-graphite electrodes highlighting sensitivities, intercept and $r^2$ of the calibration curves obtained under the specified conditions.

DETAILED DESCRIPTION OF THE DRAWINGS

Figure 1:
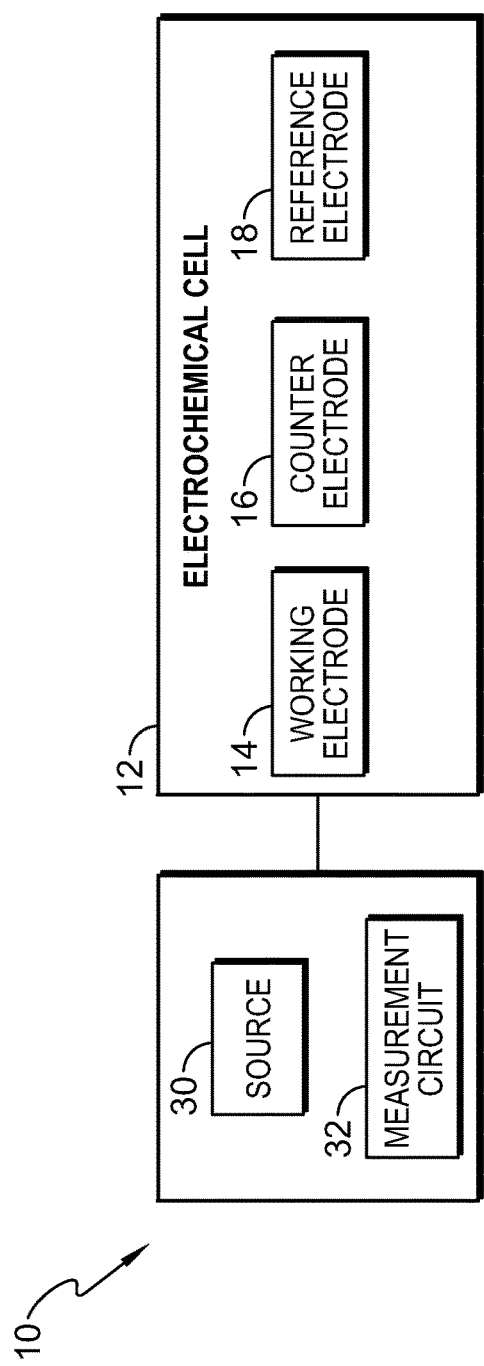
FIG. 1 is a simplified block diagram of a sensor device in accordance with an embodiment.

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring to FIG. 1, in one illustrative embodiment, a sensor device 10 includes an electrochemical cell 12 configured to be positioned within a liquid having a chemical species. The electrochemical cell 12 houses a working electrode 14, a counter electrode 16, and a reference electrode 18. In some embodiments, the electrochemical cell 12 only houses the working electrode 14 and the counter electrode 16, and does not include a reference electrode 18. In other embodiments, the reference electrode 18 and working electrode 14 may be combined into a single electrode. The working electrode 14 is electrically coupled to a source 30. The source 30 may be a current source or a voltage source. Each electrode 14, 16, 18 is coupled to a measuring circuit 32 that is configured to measure current or voltage, depending on the type of source 30.

The sensor device 10 may be used to detect chlorine species, such as chlorine or hypochlorite. In an embodiment where the source 30 is a current source, the source 30 applies a known current to the working electrode 14. The measuring circuit 32 detects a resultant current between the working electrode 14 and the counter electrode 16. By comparing the resultant current to a current at the reference electrode 18, a concentration of chemical species in the liquid may be detected.

In an embodiment where the source 30 is a voltage source, the source 30 applies a known voltage to the working electrode 14 that is held at a controlled potential relative to a reference. The measuring circuit 32 detects a resultant voltage or current between the working electrode 14 and the counter electrode 16. By comparing the resultant voltage to a voltage at the reference electrode 18, a concentration of chemical species in the liquid may be detected.

Figure 2:
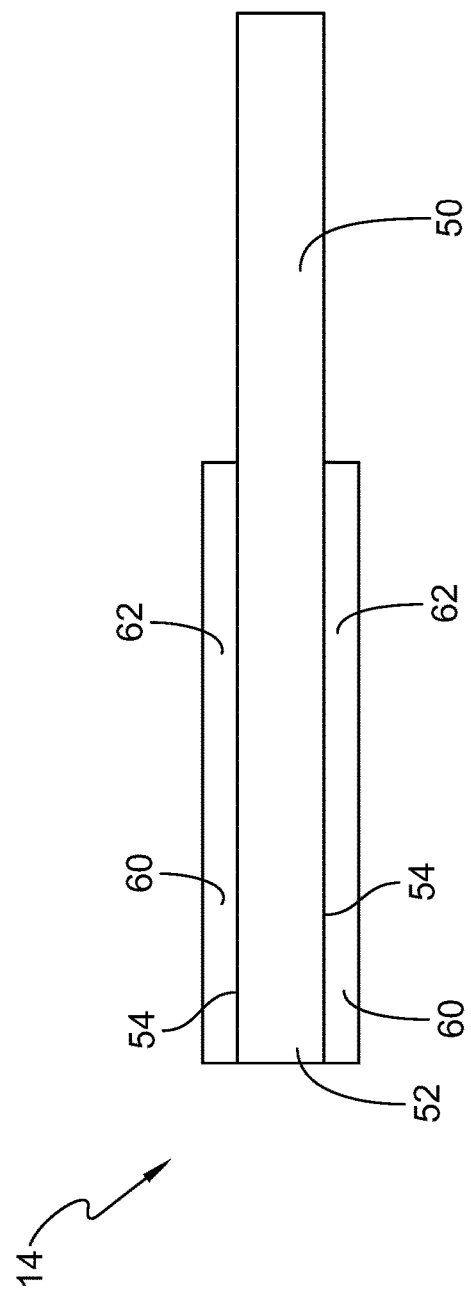
FIG. 2 is a cross-sectional view of the working electrode shown in FIG. 1.
Figure 3:
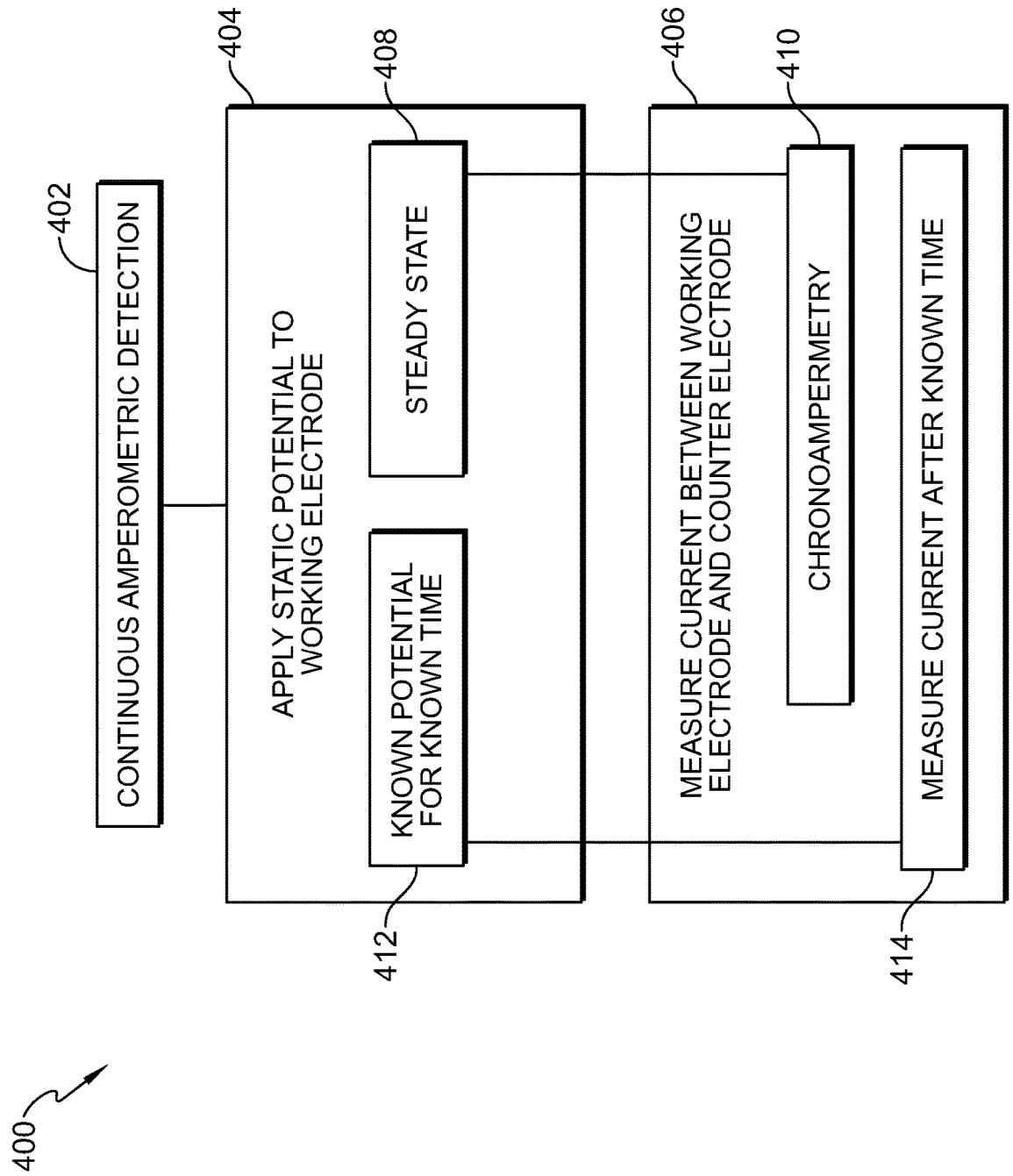
FIG. 3 is a simplified flowchart of a method for detecting chlorine species utilizing the sensor device shown in FIG. 1.

Referring now to FIG. 2, in one illustrative embodiment, the working electrode 14 includes a substrate 50 having at least one surface 52 with a coatable surface 54. In some embodiments, the electrode 14 is a composite electrode. The coatable surface 54 may be selected from at least one of nanosprings, nanotubes, diatomites, a metal, glass, mica, germanium, and silicon (including porous high surface area electrochemically etched silicon). The metal may be selected from copper or iron. The coatable surface 54 may possess suitable thermal stability, chemical stability at fabrications temperatures and surface chemistry to have a pseudo-graphite applied thereon. The coatable surface 54 may also have relatively low thermal expansion between the deposition conditions and room temperature. For synthesis/fabrication purposes this includes stable ceramics such as $SiO_2$ (which includes micro- and nano-sized structures such as nanosprings and diatomites), as well as other ceramics like $Al_2O_3$ (including halloysite and anodized aluminum oxide membranes), MgO, iron oxides, silicon, cenospheres, and the like. It also includes suitable carbons such as graphite fibers and carbon black and some high temperature tolerant metals such as tungsten and molybdenum. A pseudo-graphite 54 is coated onto the surface 52 of the substrate 50. The illustrative embodiment shows the pseudo-graphite 54 coated on two surfaces 52 of the substrate 50. In some embodiments, the pseudo-graphite is only coated on a single surface 52 of the substrate 50. In some embodiments, the pseudo-graphite 54 is coated around the substrate 50. The pseudo-graphite 54 may be modified with an electrochemically sensitive material 62 to alter a sensing property of the electrode 14 to enhance the electrode 14 for free chlorine species detection.

As used in the present disclosure, "pseudo-graphite" refers to an allotrope of carbon that is graphite-like, but that has one or more improved properties as compared to graphite and to graphene. These improved properties may include fast heterogeneous electron transfer (HET) at a basal plane of the pseudo-graphite and/or corrosion resistance greater than graphite and graphene. In some embodiments, the pseudo-graphite may be a nanocrystalline-graphite that is in Stage-2 of Ferrari's amorphization trajectory between amorphous carbon and graphite. In some embodiments, the pseudo-graphite has a nanocrystallite size of 1.5 nm, as measured by X-Ray Diffraction (XRD). The pseudo-graphite may have a layered morphology but, in contrast to graphites and graphenes, has a resistance to monoloyer exfoliation. Instead, pseudo-graphite typically exfoliates in thick films of several hundred monolayers at a time.

In some embodiments, the pseudo-graphite may have a sp2/sp3 carbon ratio of about 85/15. In other embodiments, the carbon content of the pseudo-graphite may include between 80-90% sp2 carbon and 10-20% sp3 carbon. In still other embodiments, the carbon content of the pseudo-graphite may include between 75-95% sp2 carbon and 5-25% sp3 carbon. By contrast, typical graphites and graphenes both are near 100% sp2 carbon. For clarity, the pseudo-graphite can contain additional elements besides carbon. For instance, some pseudo-graphites include about 11 atomic % hydrogen.

The appearance of pseudo-graphite may be similar to a crystalline graphite but differs in that both the basal and edge planes (EP) have facile heterogeneous electron transfer (HET) kinetics. The basal plane (BP) of graphites have a barrier to HET as these materials are zero-band gap semiconductors. On the other hand, structural defects within the molecular planes of BP pseudo-graphite may increase density of electronic states (DOS) near the Fermi-level with corresponding HET rates. With the $Fe(CN)_6^{3-/4-}$ redox probe, BP and EP pseudo-graphite have achieved a standard HET rate (k0) of 10-2 cm/s. Other distinguishing features can include slow hydrogen evolution kinetics and/or molecular planes that are impervious to sub-surface electrolyte intercalation, making the pseudo-graphite more resistant to corrosion than graphites and graphenes. These features can provide a wide electrochemical potential window of 3 V at 200 μA/cm2 in 1 M $H_2SO_4$, which surpasses other sp2 carbon electrodes by 1 V and provides pseudo-graphite similar properties to boron-doped diamond. Sensing of strongly oxidizing species, e.g. free chlorine, requires resistance to corrosion along with fast HET rates.

Illustrative examples of "pseudo-graphite," and methods of producing such materials, are disclosed in each of U.S. Pat. No. 9,691,556, U.S. Patent Application Publication No. 2012/0228555, and Humayun Kabir et al., "The sp2-sp3 carbon hybridization content of nanocrystalline graphite from pyrolyzed vegetable oil, comparison of electrochemistry and physical properties with other carbon forms and allotropes," published in Carbon, volume 144, pages 831-840. The entire disclosures of each of the foregoing references are incorporated herein by reference.

While the pseudo-graphite 54 itself possesses many advantageous electrochemical properties, modifying the pseudo-graphite 54 with other chemical groups may improve the range of functionality and efficacy of the pseudo-graphite 54 for various applications. Such functionalization can provide improved electrode characteristics for a variety of applications. One such type of application is the sensing of free chlorine species.

In one embodiment, gold nanoparticles are incorporated onto the pseudo-graphite 54. The gold nanoparticles may be deposited pre-formed onto the pseudo-graphite 54 or may be formed on the pseudo-graphite 54. Illustratively, the presence of gold nanoparticles may enhance the sensitivity of the pseudo-graphite 54 for detecting chlorine species. Such nanoparticles may be formed onto the pseudo-graphite 54 surface by direct electroreduction of gold salts at the pseudo-graphite, or by ALD/CVD or PVD of a thin layer of gold on to the graphenic surface optionally followed by a thermal annealing step to form the gold nanoparticles. Such nanoparticles can be deposited from pre-made gold nanoparticles by methods such as are known in the art including spin-coating, dip-coating, doctor-blading, and electrophoretic deposition.

In another embodiment, the pseudo-graphite 54 comprises amines. Illustratively, the amine groups may be coupled to the pseudo-graphite 54 to enhance sensitivity of the pseudo-graphite 54 for chlorine species measurement. Such amine groups may be created through Kolbe electro-oxidation of carbamic acid or salts thereof such as ammonium carbamate to produce amine radicals which are covalently grafted directly to the pseudo-graphite 54.

Figure 5:
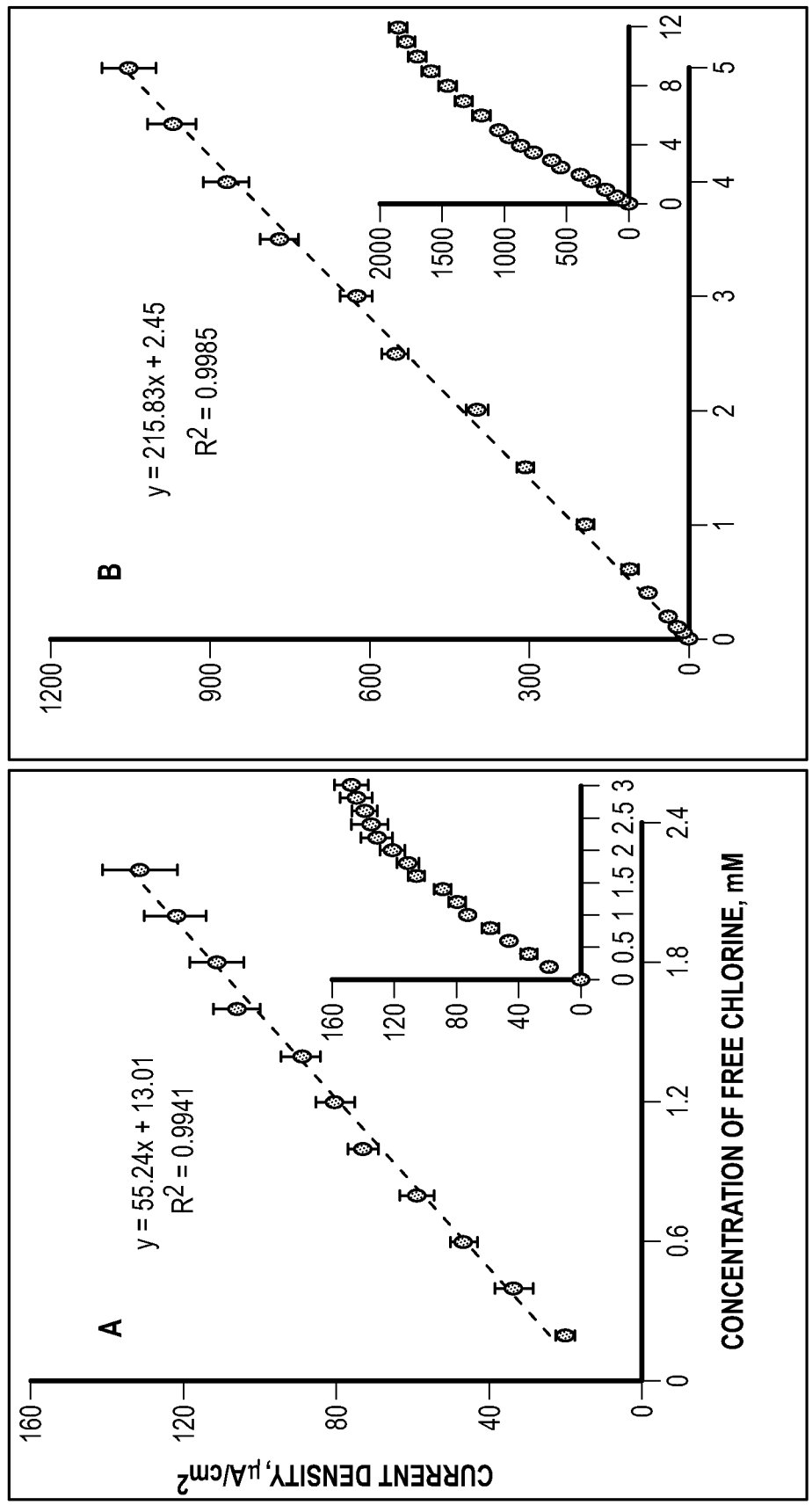
FIG. 5A is a graph of chronomperometric calibration curves (n=5) for free chlorine determination on a pseudo-graphite electrode (the insets show the corresponding entire concentration range responses)
FIG. 5B is a graph of cyclic voltammetric (B) calibration curves (n=5) for free chlorine determination on a pseudo-graphite electrode (the insets show the corresponding entire concentration range responses)

Referring now to FIG. 5, a method 400 of detecting chlorine species may include voltammetric or amperometric techniques. At block 402, chlorine species are detected by continuous amperometric techniques such as applying a static potential between the working electrode 14 and the reference electrode 18 and passing a current between the working electrode 14 and counter electrode 16 to enable the applied potential to be maintained, at block 404. At block 406, the current which flows between the working electrode 14 and the counter electrode 16 is measured. In one embodiment, applied potential forms such as a steady state applied potential are applied, at block 408. Chronoamperometry is then utilized to measure the flow of the potential between the working electrode 14 and the counter electrode 16, at block 410. In another embodiment, a known potential is applied for a known amount of time, at block 412. The current after the known amount of time is measured, at block 414. Such techniques may be applied using a variety of pseudo-graphite material-based electrodes. For instance native pseudo-graphite material may be used for performing the sensing operation. In some embodiments, the measurement may be made utilizing amperometric analysis, potentiometric analysis, cyclic voltammetric analysis, square-wave voltammetric analysis, etc.

In some embodiments, a multi-electrode system may be utilized to improve the reliability of chlorine species measurement in various environmental conditions. For example, the working electrode 14 may be incorporated with additional electrodes such as a pH measuring electrode system so that the chlorine species measurement (which is pH dependent) may be conducted without requiring the addition of reagents to buffer the pH for the system. Also for example, additional electrodes may be incorporated for measuring the conductivity of the solution so that the chlorine species measurement signal may be calibrated with input from the conductivity measurement. For example, by impressing a sufficient current density through a set of physically proximate electrodes (e.g. native pseudo-graphite material, diamond-like coated pseudo-graphite material, boron-doped diamond, etc.) the pH of the system may be altered.

In some embodiments, a multi-electrode system may be composed with electrodes containing a plurality of electrode surfaces (such as containing a native pseudo-graphite material electrode, an amine-functionalized pseudo-graphite material electrode, and a gold-nanoparticle-functionalized pseudo-graphite material electrode and potentially other electrodes). In many cases the signal of each electrode to the parameter of interest (chlorine species) may be sensitive to other parameters (e.g. pH, etc.) but will commonly have differential sensitivity for such other parameters. Therefore, by measuring the apparent signal from each and correlating the differences in the apparent signals the desired signal can be more reliably extracted. And, if desired the other interfering parameter can often be inferred as well.

Upon exposure to hypochlorite, a pseudo-graphite may experience fouling over time which decreases the sensitivity of the electrode for amperometric detection. However, the pseudo-graphite may be regenerated by applying a cathodic potential (e.g. −1.6 V in 0.1 M phosphate buffer solution at pH 7 for 5 minutes). This procedure can substantially recover the sensitivity of the pseudo-graphite material electrode.

Free chlorine is widely used in water disinfection in order to inactivate pathogenic microorganisms such as *Escherichia coli* and cryptosporidium. Free chlorine is also used in a variety of other applications spanning from household to the agriculture and food industries. In water treatment, concentration of free chlorine must fall within the range of 20-100 μM according to WHO (World Health Organization) standard. In case of industrial processes the concentration tends to fall within 10-10,000 μM. Analytical techniques for free chlorine sensing include spectrophotometry, iodimetry, chemiluminiscence, catalyst-assisted flow injection and electrochemistry. The most widely used technique for municipal water samples is colorimetry based on N,N'-diethyl-p-phenylenediamine (DPD) which has narrow concentration linear range and cannot be applied in continuous on-line monitoring systems. In contrast, electrochemical methods offer the promise of a cost effective, portable and rapid detector with continuous monitoring and little or no sample preparation.

In an experiment, cyclohexanol (99.94%), elemental sulfur (99.5%, sublimed) and sodium hypochlorite (5% m/m), potassium iodide (101.1%), potassium iodate (99.6%), sodium thiosulfate (99.5-101.0%), glacial acetic acid (99.9%) and starch (1% w/v), potassium monophosphate (99.6%), potassium diphosphate (99.8%) and potassium chloride (99.7%), paraffin were obtained. All aqueous solutions were prepared with deionized water purified by passage through an activated carbon purification cartridge. Pseudo-graphite deposition targets were constructed from quartz tubes cut into 2 cm×0.5 cm wafers. Hypochlorite solutions were standardized by iodometric titration and used within three days.

Pseudo-graphite flakes were synthesized using cyclohexanol and sulfur. All electrochemical studies were conducted in a three-electrode undivided cell with graphite rod counter electrode and Ag/AgCl/3M NaCl (aq) (0.209 V vs SHE) reference electrode and using a CV-50W potentiostat. Chronoamperometric studies at −0.15 V vs. Ag/AgCl were conducted under mass transport aided conditions by stirring at 800 rpm with a controlled growth mercury electrode cell stand.

The reduction of free chlorine proceeds as in the following equation:

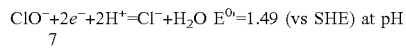

ClO$^-$+2$e^-$+2H$^+$=Cl$^-$+H$_2$O E$^{0\prime}$=1.49 (vs SHE) at pH 7

Figure 4:
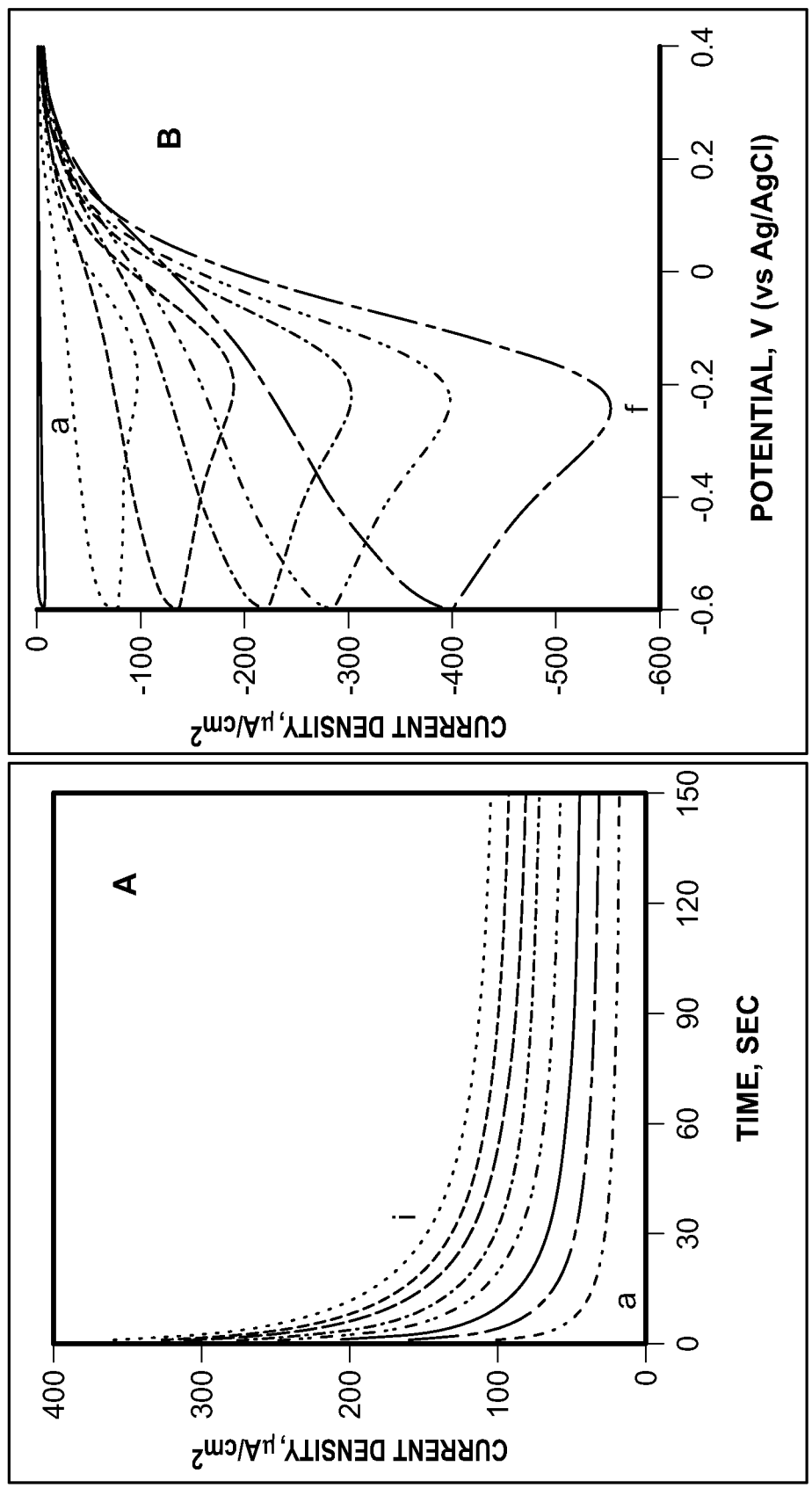
FIG. 4 is a graph of chronoamperometric and cyclic voltammetric responses of flat GUITAR electrode for different concentrations of free chlorine in 0.1 M phosphate buffer solution, pH=7.0, $N_2$ saturated.

This reaction was examined by both chronoamperometric (CA) (at −0.15 V) and cyclic voltammetric (CV) (at 50 mV/s) methods on pseudo-graphite electrodes (as shown in FIG. 4) at pH 7.0 in various concentrations of free chlorine. The CV peak potential ($E_p$) appears at −0.15 V (vs Ag/AgCl) in 1 mM free chlorine (FIG. 4B). The corresponding calibration curves are shown in FIG. 5. For that figure the CA (FIG. 5A) current densities were collected from FIG. 4A at 120 seconds. For the CV calibration curve (FIG. 5B) $E_p$ current densities are considered. The CA and CV linear ranges are 200-2,200 and 0-5,000 μM respectively and the sensitivities are 55.24 and 215.83 μA/mM-cm$^2$ respectively (n=5). The CA and CV limit of detections (S/N=3) of free chlorine are 0.5 and 1.0 μM respectively.

A comparison of LOD, linear range and sensitivity for free chlorine determination on different materials is shown in FIG. 6. Overall, pseudo-graphite has a good combination of LOD, linear range and sensitivity relative to other electrode materials. The LOD and the linear range of the pseudo-graphite-based sensor gives it more flexibility in use relative to other sensors. It is also noteworthy that pseudo-graphite is expected to be a much lower cost material than the others mentioned in FIG. 6.

Dissolved oxygen is a possible interference for free chlorine detection as indicated by the formal potential for its reduction.

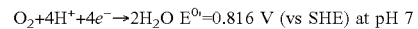

O$_2$+4H$^+$+4$e^-$→2H$_2$O E$^{0\prime}$=0.816 V (vs SHE) at pH 7

Figure 7:
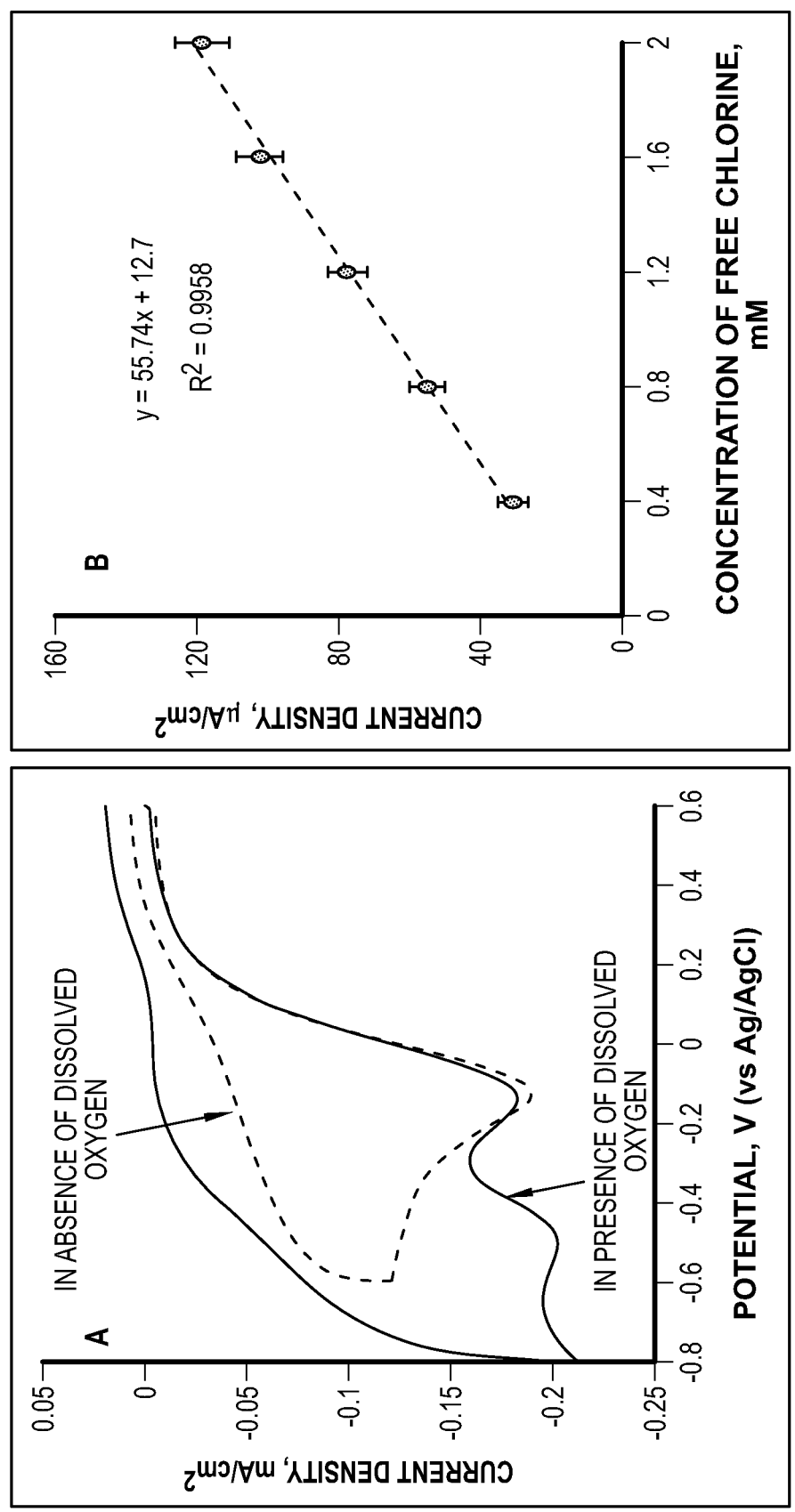
FIG. 7A is a graph of CV's of 1 mM free chlorine on a pseudo-graphite electrode in presence (solid line) and absence (dashed line) of dissolved oxygen, scan rate 50 mV/s.
FIG. 7B is calibration curve (chronoamperometric) for free chlorine determination in presence of dissolved $O_2$ at −0.15 V (n=3) in 0.1 M phosphate buffer solution, pH=7.0.
Figure 8:
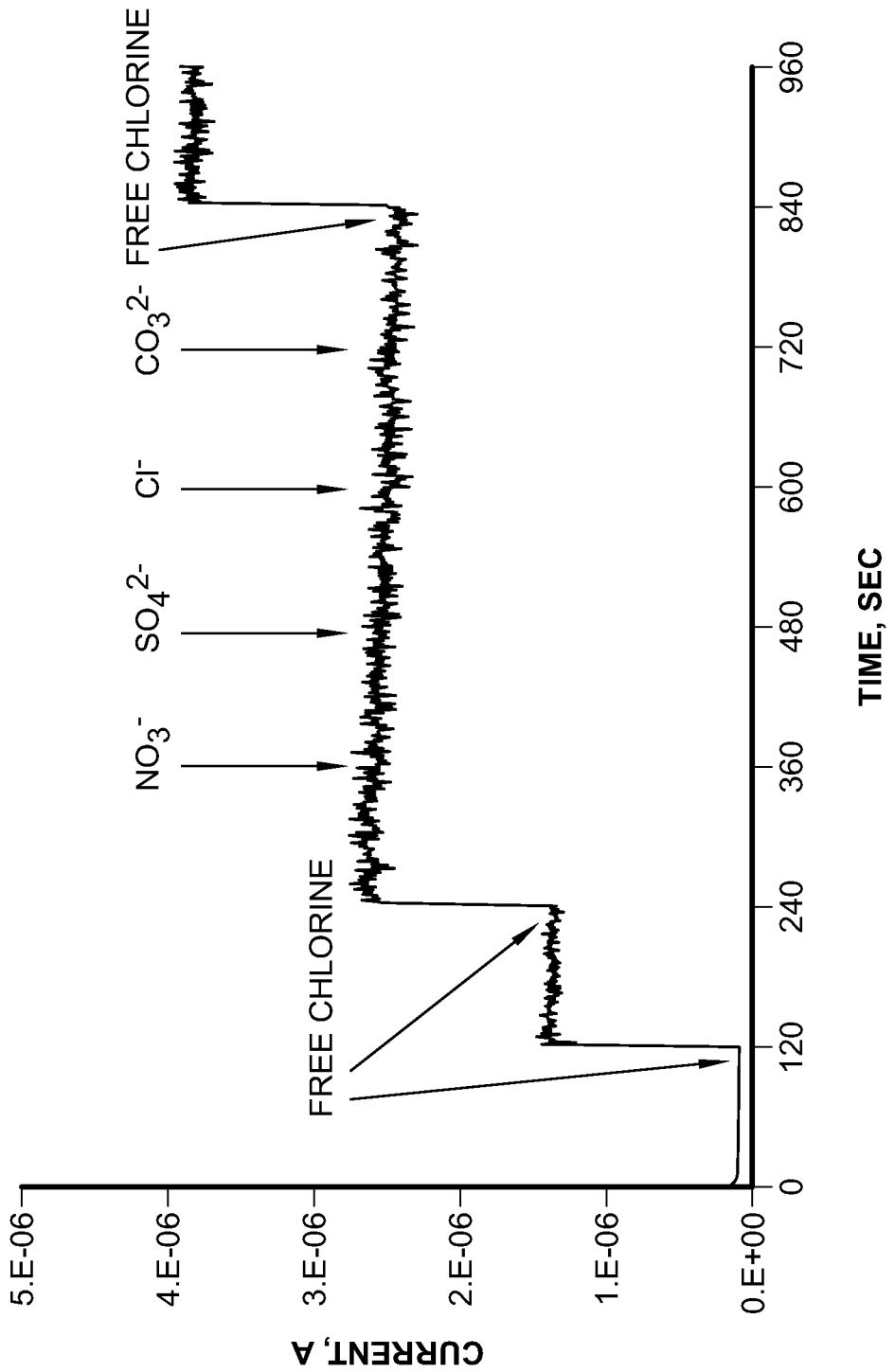
FIG. 8 is a graph of a chronoamperometric study of common ions ($NO_3^-$, $SO_4^{2-}$, $Cl^-$ and $CO_3^{2-}$) effects on the free chlorine response; each arrow is an injection of 100 μL from 10 mM of the respective solution (NaOCl, $NaNO_3$, $Na_2SO_4$, NaCl and $CaCO_3$ respectively) in 10 ml 0.1 M phosphate buffer solution, pH=7.0; none of the ions affected the response of the final free chlorine injection at 840 seconds.

FIG. 7A shows that that the CV reduction peak for dissolved oxygen (air saturation) is −0.45 V which is separated by 300 mV from free chlorine ($E_p$=−0.15 V). FIG. 8, Rows I and II highlight the results of the CA calibration curve for free chlorine determination in presence of dissolved O$_2$ (FIG. 7B) and under N$_2$ purge (FIG. 5A). Both have the same slopes and intercept demonstrating that O$_2$(aq) is not an interference with this sensor.

FIG. 8 shows the effects of other potential interferences. In that study the effects of 100 μL spikes from 10 mM of free chlorine (NaOCl), NaNO$_3$, Na$_2$SO$_4$, NaCl and CaCO$_3$ are measured by chronoamperometry. The first two spikes of free chlorine solutions (at 120 and 240 seconds) give proportional responses via Reaction 1. The pseudo-graphite electrode did not respond to the introduction of the other salts. The spike at 840 seconds indicates that the electrode still gives a proportional response to free chlorine.

The response of the pseudo-graphite electrode is found stable after 4 days of continuous exposure to 1 mM free chlorine solution in 0.1 M phosphate buffer solution at pH 7.0 (Figure S1, see supporting information). FIG. 9, Row III shows the sensitivity (slope), intercept and correlation values for each day obtained by chronoamperometry at −0.15 V. After 7 days of continuous exposure in free chlorine solution pseudo-graphite electrodes experience a 37% loss in sensitivity (from 56.8 to 35.7 μA/mM-cm$^2$) as summarized in FIG. 9, Row III. An in-situ regeneration protocol was developed to extend the life time of this sensor. This process applied −1.6 V (vs Ag/AgCl) for 10 min in 0.1 M phosphate buffer solution, pH=7.0. The regenerated pseudo-graphite electrode recovered 94% of the initial sensitivity (FIG. 9, Row IV). Literature reports free chlorine sensor electrodes with signal stabilities from hours to several months (see FIG. 6). Again when considering LOD, linear range, sensitivity along with sensor lifetime, pseudo-graphite electrodes are very competitive with literature.

The focus on electrochemical free chlorine sensors have been with materials of relatively high costs. Pseudo-graphite will be inexpensive relative to these materials (see FIG. 6) with competitive detection limit, linear range, and sensitivity. Furthermore, pseudo-graphite is not effected from possible common aqueous species and interferences O$_2$, Ca$^{2+}$, Na$^+$, NO$_3^-$, SO$_4^{2-}$, Cl$^-$ and CO$_3^{2-}$. A significant feature of pseudo-graphite is long term signal stability and the ability to recover sensitivity with the eventual fouling of the electrode surface. Relative to recent advances in fluorescence method and classical colorimetric method (N,N-diethyl-p-phenylenediamine), the presented technique has much wider linear range (0.05-15 vs. 0-5000 µM). Furthermore, the pseudo-graphite-based method is more rapid and offers continuous monitoring capabilities. Another feature is that pseudo-graphite electrodes can be fabricated into a variety of geometries including micron and smaller dimensions. These qualities indicate possible application ranging from home use to embedded sensors where durability and continuous monitoring is required.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

The invention claimed is:

1. A method comprising:
   coating a pseudo-graphite onto a surface of an electrode substrate to produce a pseudo-graphite surface that does not include amine groups or gold nanoparticles,
   exposing the pseudo-graphite surface to a sample comprising chlorine species,
   applying a current or a voltage to the pseudo-graphite surface exposed to the sample,
   measuring a signal from the pseudo-graphite surface exposed to the sample in response to the applied current or the applied voltage, and
   measuring a concentration of the chlorine species in the sample based on the signal.

2. The method of claim 1, wherein the electrode substrate and the pseudo-graphite surface form at least part of a working electrode.

3. The method of claim 2, further comprising measuring the concentration of the chlorine species by measuring a current flow between the working electrode and a counter electrode.

4. The method of claim 3, further comprising applying at least one of a steady state potential or a known potential to the working electrode.

5. The method of claim 1, wherein the pseudo-graphite has fast heterogeneous electron transfer at a basal plane.

6. The method of claim 1, wherein the pseudo-graphite has a corrosion resistance greater than graphitic materials.

7. The method of claim 1, wherein a carbon content of the pseudo-graphite includes 80-90% sp2 carbon and 10-20% sp3 carbon.

8. The method of claim 2, further comprising measuring the concentration of the chlorine species by measuring a current flow between the working electrode and a counter electrode using chronoamperometry, wherein the method has a limit of detection of 0.5 µM for the chlorine species and a linear detection range of 200 to 2,200 µM for the chlorine species.

9. The method of claim 2, further comprising measuring the concentration of the chlorine species by measuring a current flow between the working electrode and a counter electrode using cyclic voltammetry, wherein the method has a limit of detection of 1 µM and a linear detection range 0 to 5,000 µM for the chlorine species.

10. The method of claim 1, further comprising applying a cathodic potential to the pseudo-graphite surface to recover the sensitivity of the pseudo-graphite surface after exposure to the chlorine species.

11. The method of claim 1, wherein the pseudo-graphite surface comprises a native pseudo-graphite material.

12. An electrode comprising:
   an electrode substrate with a surface, and
   a pseudo-graphite coated onto the surface of the electrode substrate to produce a pseudo-graphite surface to be exposed to chlorine species in a sample, wherein the pseudo-graphite surface does not include amine groups or gold nanoparticles;
   wherein the pseudo-graphite surface is configured to produce a signal when exposed to the chlorine species and in response to a current or a voltage applied to the pseudo-graphite surface, wherein the signal is used to measure a concentration of the chlorine species in the sample.

13. The electrode of claim 12, wherein the pseudo-graphite has a corrosion resistance greater than graphitic materials.

14. The electrode of claim 12, wherein a carbon content of the pseudo-graphite includes 80-90% sp2 carbon and 10-20% sp3 carbon.

15. The electrode of claim 12, wherein the electrode has a limit of detection of 0.5 µM for the chlorine species and a linear detection range of 200 to 2,200 µM for the chlorine species, measured using chronoamperometry.

16. The electrode of claim 12, wherein the electrode has a limit of detection of 1 µM for the chlorine species and a linear detection range of 0 to 5,000 µM for the chlorine species, measured using cyclic voltammetry.

17. The electrode of claim 12, wherein the pseudo-graphite surface comprises a native pseudo-graphite material.

18. A sensor comprising:
   a working electrode,
   a counter electrode,
   an electrical source to supply at least one of a current or a voltage to the working electrode, and
   a measurement circuit to measure a resultant signal from the working electrode,
   wherein the working electrode includes:
      an electrode substrate with a surface, and
      a pseudo-graphite coated onto the surface of the electrode substrate to produce a pseudo-graphite surface to be exposed to chlorine species in a sample, wherein the pseudo-graphite surface does not include amine groups or gold nanoparticles; and
   wherein the resultant signal is used to measure a concentration of the chlorine species in the sample.

19. The sensor of claim 18, wherein the sensor has a limit of detection of 0.5 µM for the chlorine species and a linear detection range of 200 to 2,200 µM for the chlorine species, measured using chronoamperometry.

20. The sensor of claim 18, wherein the sensor has a limit of detection of 1 µM and a linear detection range of 0 to 5,000 µM for the chlorine species, measured using cyclic voltammetry.

21. The sensor of claim 18, wherein the sensor is configured to detect free chlorine in a sample without inference from dissolved oxygen.

22. The sensor of claim 18, wherein the pseudo-graphite surface comprises a native pseudo-graphite material.

\* \* \* \* \*